United States Patent

[11] 3,616,977

| [72] | Inventor | Emil Zurmuhlen<br>Brackwede, Germany |
|---|---|---|
| [21] | Appl. No. | 844,769 |
| [22] | Filed | July 25, 1969 |
| [45] | Patented | Nov. 2, 1971 |
| [73] | Assignee | Firma ESGE-Marby Gesellschaft mit<br>beschrankter Haftung & Co.<br>Brake rear Bielefeld, Germany |
| [32] | Priority | July 26, 1968 |
| [33] | | Germany |
| [31] | | P 17 80 044.1 |

[54] COMBINATION TOOL CARRIER AND CYCLE LUGGAGE RACK
4 Claims, 6 Drawing Figs.

[52] U.S. Cl. .................................................... 224/32
[51] Int. Cl. ..................................................... B62j 7/00

[50] Field of Search ............................................ 224/30, 32, 32.1

[56] References Cited
UNITED STATES PATENTS

| 2,051,823 | 8/1936 | Clarke .......................... | 224/35 |
| 3,300,110 | 1/1967 | Zurmuhlen .................. | 224/39 |

*Primary Examiner*—Gerald M. Forlenza
*Assistant Examiner*—John Mannix
*Attorney*—Flynn & Frishauf

ABSTRACT: The carrier has a flat article support region and an article counterstop formed of a pair of inverted, U-shaped bends connected to the flat article support region; a tool carrier is located between the legs of the U-shaped bends, preferably formed as an integral molding of plastic material together with bumper and counterstrips snapped over the U-shaped legs of the carrier.

Emil ZURMÜHLEN,
Inventor

COMBINATION TOOL CARRIER AND CYCLE LUGGAGE RACK

The present invention relates to a combination tool carrier and cycle luggage rack, and particularly, a combination bicycle luggage rack to which a plastic molded tool carrier can be snapped. The particular luggage rack which is preferably used in the combination is disclosed and claimed in applicant's U.S. Pat. No. 3,300,110, Jan. 24, 1967.

The aforementioned U.S. Pat. No. 3,300,110 discloses a bicycle luggage rack in which a pair of parallel holding bars have an upstanding U-shaped portion, each, which is adapted to be attached to the frame of the bicycle, to form a counterstop for articles to be carried on the luggage rack. The space beneath the U-shaped bends is frequently taken up by the mechanism of rim brakes. If the bicycle has such rim brakes, it is then difficult to insert a toolbox beneath the U-shaped bend and still provide sufficient space for the operating mechanism of the brake. Additionally, since the toolbox hangs on the bicycle luggage rack, separate fastening means are required.

It is an object of the present invention to provide a combination toolbox-luggage rack which is so constructed that space necessary for a brake operating mechanism is not blocked, and which is inexpensive to manufacture, yet provides easy access to the tool carrier.

SUBJECT MATTER OF THE PRESENT INVENTION

Briefly, in accordance with the present invention, a flat toolbox carrier is mounted on the upstanding legs of the U facing the luggage rack portion of the luggage rack assembly, so that sufficient space for a brake mechanism will still be provided behind the toolbox. Preferably the toolbox and plastic bumpers against which articles to be carried can bear, form one integral plastic molding. The toolbox is preferably laid out with a foamed material into which the shapes of the tools to be carried are molded, the tools to be retained therein, to prevent rattles.

The invention will be described by way of example with reference to the accompanying drawings, wherein.

Figure 1:
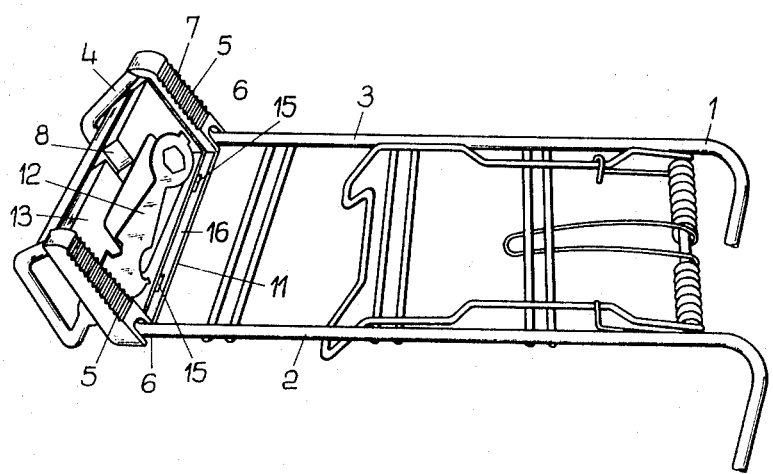
FIG. 1 is a schematic perspective view of the carrier of the present invention, the toolbox being open.

The luggage rack 1 has the usual bars or frame members 2, 3, forming a flat luggage-carrying portion. The bars 2, 3 of the frame, each, terminate at one end in bent-over supports adapted to be secured to the axle of a bicycle, as well known and, for example, illustrated in the aforementioned U.S. Pat. No. 3,300,110. The other ends of bars 2, 3, terminate in U-shaped bends 4. The legs of the U-shaped bends facing the article-carrying section of bars 2, 3, have plastic bumpers having notches 6 snapped over the bars. Bars 5 are preferably formed with serrations or corrugations 7 in order to better hold articles.

Figure 2:
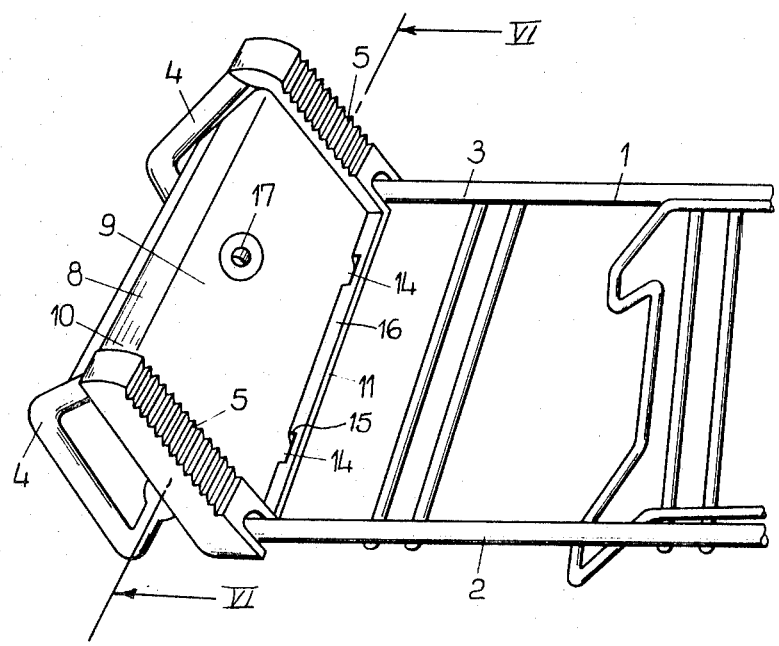
FIG. 2 is an enlarged fragmentary view of the assembly showing the toolbox closed.
Figure 3:
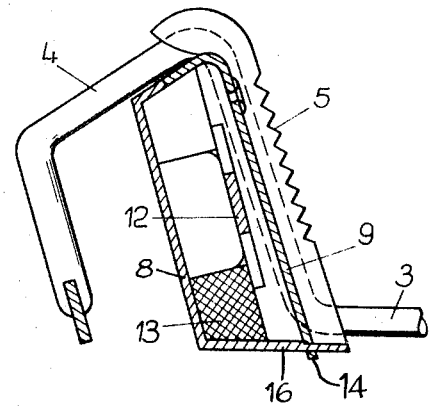
FIG. 3 is a vertical, cross-sectional view through the toolbox and part of the luggage rack, along lines III—III of FIG. 4.
Figure 4:
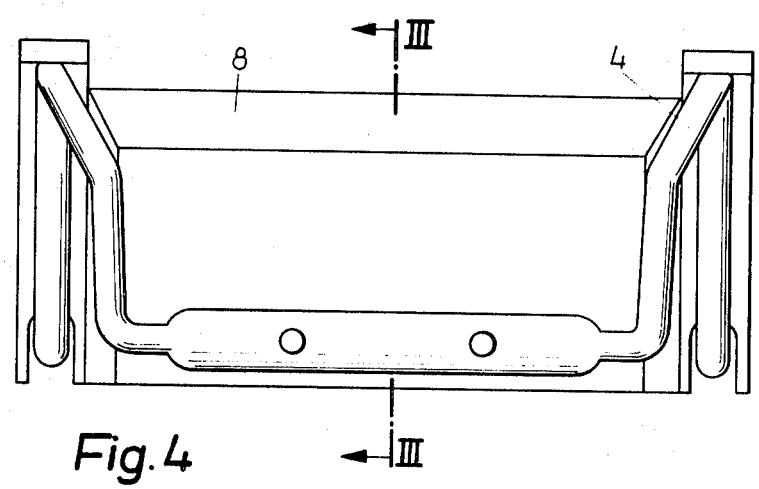
FIG. 4 is a rear view of the toolbox and the luggage rack.

Tool carrier 8 is located between bumpers 5, preferably forming a unitary molding therewith. The front of box 8 is a cover 9 (FIGS. 2, 3), The upper transverse side 10, as well as front cover 9 may be recessed with respect to the bumpers 5, as best seen in FIG. 2. The lower side 16 has its front edge 11 extending approximately to the front side of the bumpers 5. A flat tool carrier box is thus provided, being, however, of sufficient size to retain the usual flat wrenches as well as a tire-patching kit. Tools 12 to be located within carrier 8 are preferably retained in a foam cushion 13, which may be molded in the shape of the tools so that the tools fit therein in predetermined location, and to avoid rattling during use of the bicycle.

Cover 9 of the toolbox has extending lugs 14 fitting into slits 15 in bottom 16 of box 8. The cover 9 can thus be folded down and, if desired, be removed. A lock 17 for the tools is provided to keep cover 9 closed, the lock preferably being so constructed that it can be opened only with a key. The tool carrier is light, and can be easily attached to a luggage rack. Regardless of whether bumpers 5 are nonunitary with the tool carrier, or form a single unitary element therewith, no separate attachments or mounting of the tool carrier is necessary since, to secure the tool carrier, it is only necessary to snap bumpers 5 over the U-shaped ends of bars 2, 3. This is particularly simple when the bumpers 5 are made of resilient plastic material. The appearance of the entire luggage rack and toolbox is pleasing, and additionally provides protection to the brake mechanism of any rim brakes located behind the toolbox and in the space beneath the U-shaped legs of the carrier.

Figure 5:
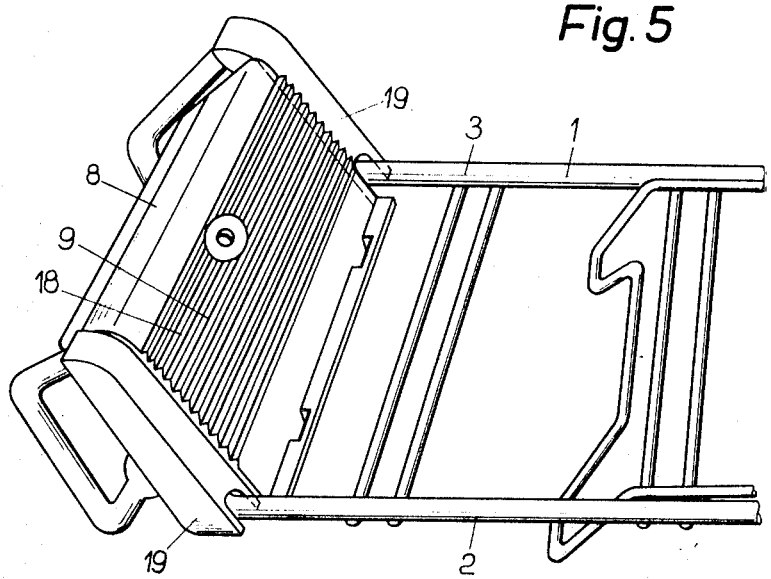
FIG. 5 is a perspective view of a different embodiment of the present invention.
Figure 6:
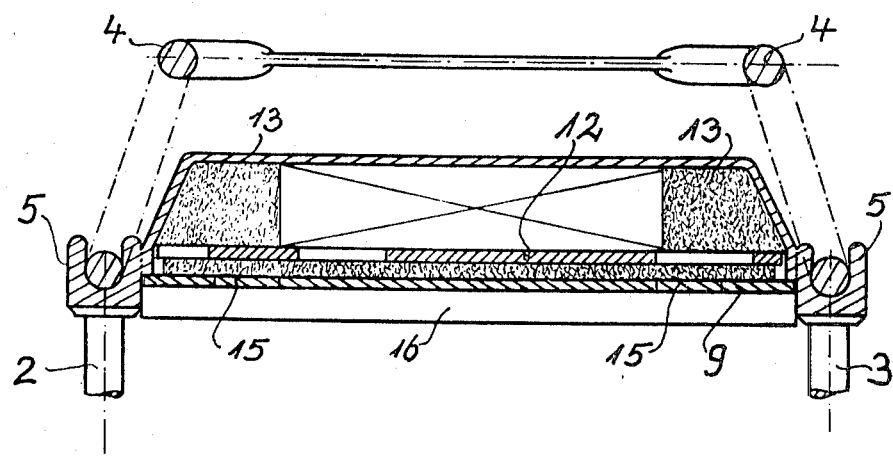
FIG. 6 is a transverse cross-sectional view along lines VI—VI of FIG. 2.

The tool carrier may be directly mounted on the upstanding legs of the U-shaped ends of bars 2, 3. Referring to FIG. 5, the side of the cover 9 facing the article-carrying portion is itself serrated, or corrugated and forms a counterstop for articles to be carried on the rack, the corrugations being seen at 18. Instead of the bumpers 5 (FIG. 1) the tool carrier itself is integral with recessed end pieces 19, each formed of plastic material, and slipped over the legs of bars 2, 3 of the luggage rack. The flat construction, and the absence of a hanging attachment enables inexpensive construction and rapid mounting with a minimum amount of labor while providing a tool carrier of sufficient size to retain the usual tools for on-the-spot repair.

I claim:

1. Combined tool carrier and cycle luggage rack, said luggage rack having a pair of parallel article-carrying bars (2, 3) adapted to be attached at one end thereof to the axle of a cycle wheel, said bars having a flat article support region and, at the other end thereof, a projecting article counterstop region, the article counterstop region comprising an inverted U-shaped bend formed in each of said bars, the legs of the U being parallel and spaced from each other and connected by an extended top portion to form a spacer for the tool carrier therebeneath, the legs of each U bend remote from the article support region being interconnected and adapted to be connected to the frame of the cycle, strips of elastic material resiliently clamped on the legs of the U-shaped bends forming the article support region, and a flat, boxlike tool carrier structure located between and secured to the strips clamped on the spaced legs of the U adjacent the article support region and extending between said strips.

2. The combination of claim 1, wherein said strips form bumpers of elastic material and said boxlike structure and said bumpers comprise a single unitary molded body.

3. The combination of claim 1, wherein said flat, boxlike structure has a surface facing said article support region which is corrugated and extends between the respective legs of the U-shaped bends formed in each of said bars whereby a connecting surface between said bars forming an article holding surface is provided.

4. The combination of claim 1, wherein said strips of plastic material resiliently clamped on the legs of the U-shaped bends and said boxlike structure are of similar plastic material integrally molded with said strips, and resilient, foamed material is provided fitting within said boxlike structure and molded in the shape of the outline of tools to be received within said tool carrier.